(12) United States Patent
Agarwal et al.

(10) Patent No.: US 11,864,069 B2
(45) Date of Patent: Jan. 2, 2024

(54) NETWORK SLICE BASED BILLING

(71) Applicant: Cisco Technology, Inc., San Jose, CA (US)

(72) Inventors: Amit Agarwal, Karnataka (IN); Rajpal Bhoria, Haryana (IN); Praveen Joseph, Ka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 215 days.

(21) Appl. No.: 17/088,156

(22) Filed: Nov. 3, 2020

(65) Prior Publication Data

US 2022/0141630 A1    May 5, 2022

(51) Int. Cl.
  *H04W 4/24*   (2018.01)
  *H04W 4/021*  (2018.01)
  *H04M 15/00*  (2006.01)

(52) U.S. Cl.
  CPC ......... *H04W 4/24* (2013.01); *H04M 15/8033* (2013.01); *H04W 4/021* (2013.01); *H04M 2215/0152* (2013.01); *H04M 2215/2026* (2013.01); *H04M 2215/32* (2013.01)

(58) Field of Classification Search
  CPC ... H04W 4/24; H04W 4/021; H04M 2215/32; H04M 2215/2026; H04M 17/00; H04M 15/00; H04M 15/8033; H04M 2215/0152
  See application file for complete search history.

(56) References Cited

U.S. PATENT DOCUMENTS

| | | | | |
|---|---|---|---|---|
| 8,818,331 B2 * | 8/2014 | Mohammed | .......... | H04M 15/80 455/406 |
| 10,349,240 B2 * | 7/2019 | Senarath | ................. | H04W 4/24 |
| 11,240,644 B2 * | 2/2022 | Senarath | ............... | H04L 47/805 |
| 2004/0210522 A1 * | 10/2004 | Bissantz | ............... | H04M 15/41 705/40 |
| 2009/0205046 A1 * | 8/2009 | Radosavac | ............ | H04L 63/105 726/23 |
| 2011/0276447 A1 * | 11/2011 | Paul | ....................... | G06Q 30/04 709/227 |
| 2018/0220276 A1 * | 8/2018 | Senarath | ........... | H04M 15/8016 |

(Continued)

FOREIGN PATENT DOCUMENTS

| | | | | |
|---|---|---|---|---|
| CN | 110622573 A | * | 12/2019 | ......... H04L 12/1407 |
| WO | WO-2019005067 A1 | * | 1/2019 | ......... H04L 12/1407 |

(Continued)

OTHER PUBLICATIONS

3GPP TS 32.298 v16.6.1; Charging Data Record (CDR) parameter description; (Sep. 2020) pp. 17 and 110-111 (Year: 2020).*

(Continued)

*Primary Examiner* — Matthew C Sams
(74) *Attorney, Agent, or Firm* — Edell, Shapiro & Finnan, LLC

(57) ABSTRACT

Techniques are described herein for network sliced based billing. In one example, a control center obtains, from a charging system, a charging data record that includes an indication of a network slice associated with a chargeable telecommunications event. Based on the indication of the network slice, the control center identifies a charging rate for the chargeable telecommunications event and applies the charging rate to the chargeable telecommunications event.

20 Claims, 7 Drawing Sheets

(56) References Cited

U.S. PATENT DOCUMENTS

| | | | |
|---|---|---|---|
| 2018/0262924 A1* | 9/2018 | Dao | H04W 24/02 |
| 2019/0037409 A1* | 1/2019 | Wang | H04W 8/08 |
| 2019/0289444 A1 | 9/2019 | Senarath et al. | |
| 2020/0068074 A1 | 2/2020 | Cai et al. | |
| 2020/0092423 A1* | 3/2020 | Qiao | H04W 8/08 |
| 2020/0092424 A1* | 3/2020 | Qiao | H04M 15/8033 |
| 2020/0145538 A1* | 5/2020 | Qiao | H04M 15/8038 |
| 2020/0169951 A1* | 5/2020 | Cai | H04W 4/24 |
| 2021/0120425 A1* | 4/2021 | Fikouras | G06F 21/6218 |
| 2021/0152380 A1* | 5/2021 | Yan | H04L 67/14 |
| 2021/0281997 A1* | 9/2021 | Chai | H04W 8/18 |
| 2022/0053306 A1* | 2/2022 | Yang | H04L 41/342 |
| 2022/0217005 A1* | 7/2022 | Zhu | H04M 15/785 |

FOREIGN PATENT DOCUMENTS

| | | | |
|---|---|---|---|
| WO | 2019210476 A1 | 7/2019 | |
| WO | 2020143502 A1 | 7/2020 | |
| WO | WO-2021226530 A1 * | 11/2021 | |
| WO | WO-2022036081 A1 * | 2/2022 | |

OTHER PUBLICATIONS

3GPP, "3rd Generation Partnership Project; Technical Specification Group Services and System Aspects; Charging management; Study on Charging Aspects of Network Slicing; (Release 16)", 3GPP TR 32.845 V16.0.0, Dec. 2019, 44 pages.

Robert Törnkvist et al., "Charging and Billing Architecture for 5G Network", Journal of ICT, vol. 7 2, doi: 10.13052/iicts2245-800X. 728, May 2019, pp. 185-194.

Cisco DevNet, "Cisco IoT Control Center Overview", retrieved from Internet Aug. 7, 2020, 3 pages.

Cisco, "Internet of Things (IoT)—Cisco Jasper Control Center", retrieved from Internet Aug. 7, 2020, 6 pages.

Ken Davidson, "Cisco IoT Control Center: New innovations to help you manage IoT cellular at scale", Feb. 20, 2020, 6 pages.

Cisco, "Automated Connectivity Management Platform", Feb. 20, 2020, 2 pages.

\* cited by examiner

NETWORK SLICE BASED BILLING

TECHNICAL FIELD

The present disclosure relates to telecommunications technology.

BACKGROUND

Fifth generation (5G) cellular networks are increasingly adopted and deployed. The 5G billing and charging architecture includes a converged charging interface that supports online charging, offline charging, and production of data records. Interaction with a billing system occurs through the Charging Function (CHF) in a converged charging system.

DESCRIPTION OF EXAMPLE EMBODIMENTS

Overview

Techniques are described herein for network sliced based billing. In one example embodiment, a control center obtains, from a charging system, a charging data record that includes an indication of a network slice associated with a chargeable telecommunications event. Based on the indication of the network slice, the control center identifies a charging rate for the chargeable telecommunications event and applies the charging rate to the chargeable telecommunications event.

EXAMPLE EMBODIMENTS

Figure 1:
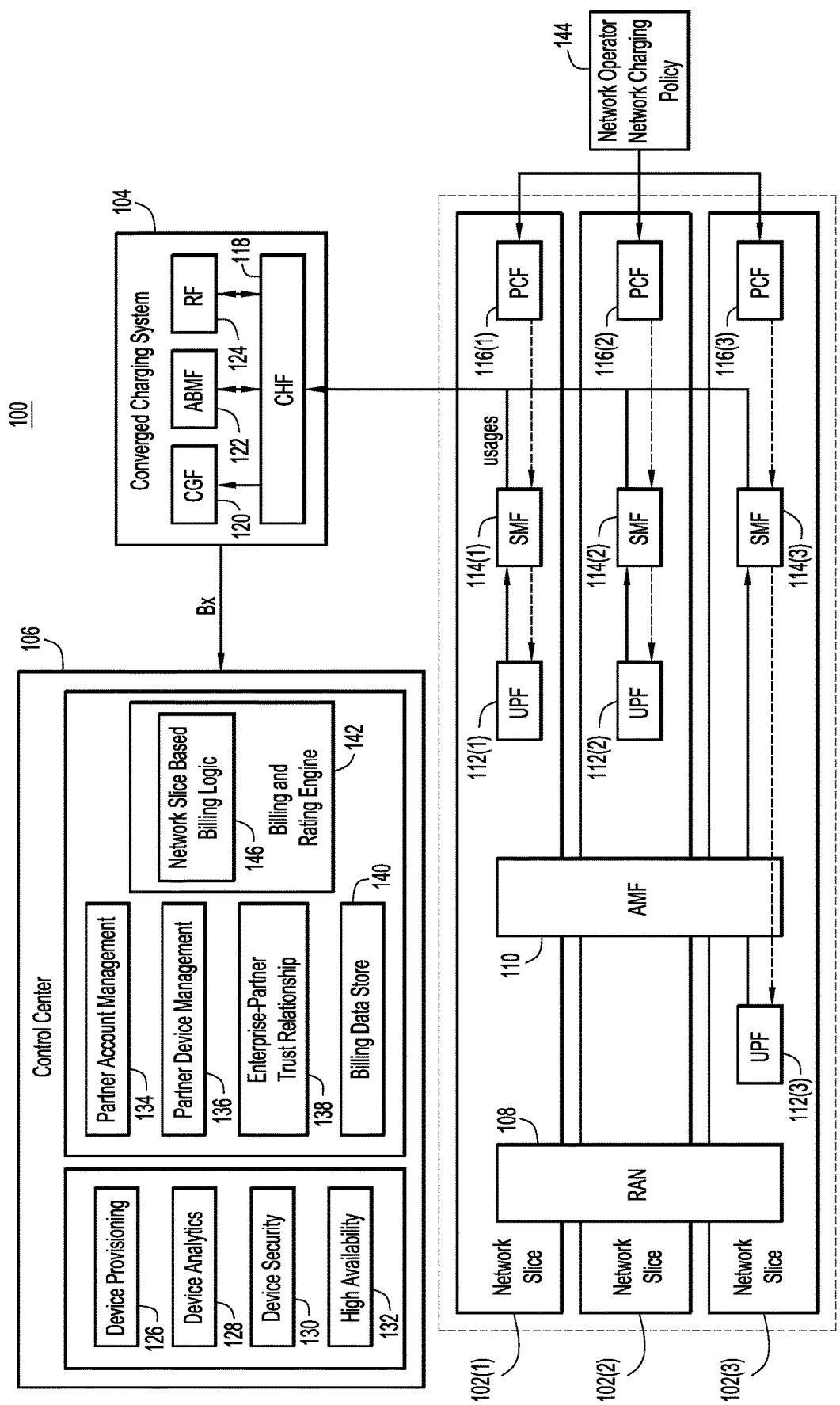
FIG. 1 illustrates a block diagram of a system configured for network slice based billing, according to an example embodiment.

FIG. 1 illustrates a block diagram of a system 100 configured for network slice based billing. System 100 includes network slices 102(1)-102(3), converged charging system 104, and Control Center 106. Network slice 102(1) includes Radio Access Network (RAN) 108, Access and Mobility Management Function (AMF) 110, User Plane Function (UPF) 112(1), Sessions Management Function (SMF) 114(1), and Policy Control Function (PCF) 116(1). Network slice 102(2) includes RAN 108, AMF 110, UPF 112(2), SMF 114(2), and PCF 116(2). Network slice 102(3) includes RAN 108, UPF 112(3), AMF 110, SMF 114(3), and PCF 116(3).

Converged charging system 104 includes Charging Function (CHF) 118, Charging Gateway Function (CGF) 120, Account Balance Management Function (ABMF) 122, and Rating Function (RF) 124. Control Center 106 includes device provisioning logic 126, device analytics logic 128, device security logic 130, and high availability logic 132. Control Center 106 further includes partner account management logic 134, partner device management logic 136, enterprise-partner trust relationship logic 138, and billing data store 140. Control Center 106 still further includes billing and rating engine 142.

Network slices 102(1)-102(3) may be independent logical networks that help meet specific networking requirements. RAN 108 may be a next generation Node B (gNodeB) that includes a Centralized Unit (CU) and a Distributed Unit (DU), and may be configured to provide network connectivity to a User Equipment (UE). AMF 110 may be configured to handle mobility management operations. UPFs 112(1)-112(3) may be configured to carry user plane network traffic between RAN 108 and a data network (e.g., the Internet). SMFs 114(1)-114(3) may be configured to provide charging events (e.g., usage record generations) to converged charging system 104 on behalf of one or more UEs. PCFs 116(1)-116(3) may be configured to control policies, such as network operator (e.g., Communication Service Provider (CSP)) network charging policies 144. UPFs 112(1)-112(3), SMFs 114(1)-114(3), and PCFs 116(1)-116(3) may be configured to perform operations on behalf of network slices 102(1)-102(3), respectively.

Converged charging system 104 may be configured to generate Charging Data Records (CDRs) that include usage data based on charging events obtained from SMFs 114(1)-114(3), and to provide the CDRs to Control Center 106 (e.g., over the Bx interface). CHF 118 may be configured to obtain the charging events from SMFs 114(1)-114(3), generate the CDRs, and provide the CDRs to CGF 120. CGF 120 may be configured to obtain the CDRs from CHF 118, process the CDRs, and provide the CDRs to Control Center 106. ABMF 122 may be configured to provide, to CHF 118, information regarding one or more balances associated with an account of a given UE. RF 124 may be configured to provide, to CHF 118, information regarding a charging rate(s) corresponding to the charging events. CHF 118 may generate the CDRs based on the information obtained from ABMF 122 and RF 124.

Control Center 106 may be any suitable control center, (e.g., an Internet of Things (TOT) Control Center, a Communication Service Management Function (CSMF), etc.) configured to provide a framework to support partner account and partner device management. Control Center 106 may maintain the billing data used to generate electronic invoice data for one or more accounts. In one example, at the end of every billing cycle, Control Center 106 consolidates invoice-ready data and displays that data online as an invoice. A number of different factors may influence the costs presented on an invoice, including the rate plans used by the account devices (e.g., UEs), the amount of usage for each device, and the billing settings attached to the network operator and the account.

Device provisioning logic 126, device analytics logic 128, device security logic 130, high availability logic 132, partner account management logic 134, partner device management logic 136, and enterprise-partner trust relationship logic 138 may help Control Center 106 to generate the appropriate invoice amounts. Billing data store 140 may be a database of billing (e.g., CDR) information to enable Control Center 106 to generate the electronic invoice data. Billing and rating engine 142 may be responsible for generating the electronic invoice data based on the logic and information stored at Control Center 106.

In one example, a connected (e.g., autonomous) car traveling in a smart city may be a multi-slice device (i.e., capable of attaching to network slices 102(1)-102(3)). The connected car may utilize a number of different types of services over network slices 102(1)-102(3), possibly simultaneously. For instance, network slice 102(1) may be a NarrowBand (NB) network slice configured to provide services such as remote diagnostics and management, real-time sensing and monitoring, emergency response, etc. Network slice 102(2) may be an Ultra Reliable Low Latency Communication (URLLC) network slice configured to provide enhanced, on-board, real-time navigation services. Network slice 102(3) may be an enhanced Mobile Broadband (eMBB) network slice configured to provide High-Definition (HD) video streaming services for video played on the in-vehicle infotainment system.

In this example, there are many different parties involved in providing these services to the connected car. A network operator is responsible for managing network slices 102(1)-102(3). An enterprise associated with network slice 102(1) (e.g., the connected car manufacturer) may provide the aforementioned services over network slice 102(1). A first partner/vendor (e.g., a Global Positioning Systems (GPS) provider) may provide the navigation services over network slice 102(2) on behalf of the enterprise. A second partner (e.g., a video streaming provider) may provide the HD video streaming services over network slice 102(3) on behalf of the enterprise. The network operator may charge the enterprise for use of network slices 102(1)-102(3), and the enterprise may further have contracts in place with the first and second partners to provide different end-consumer services (e.g., navigation services, HD video streaming, etc.).

It will be appreciated that the connected car example is just one possible scenario to which techniques described herein may be applied. Any suitable network operator (e.g., multiple network operators responsible for managing respective network slices), enterprise (e.g., connected car manufacturer, connected factory, Internet of Things provider, etc.), and/or partner (e.g., navigation provider, video streaming provider, audio streaming provider, etc.) may be involved. Moreover, network slices 102(1)-102(3) may be any suitable network slice, such as a private network slice designated for a single enterprise or a public network slice shared among multiple enterprises.

Legacy billing systems generate electronic invoice data based on minutes and/or bytes of network usage. In other words, existing billing models are subscription-based, which is a simplistic approach that can limit generation of electronic invoice data. For example, in the aforementioned connected car scenario, it would not be possible to invoice one or more of the involved parties based on network slice using conventional techniques.

Accordingly, the high-level architecture depicted in FIG. 1 permits interaction between converged charging system 104 and billing and rating engine 142 to provide network slice based billing. More specifically, network slice based billing logic 146 is provided in billing and rating engine 142 to enable Control Center 106 to generate electronic invoice data based on network slices 102(1)-102(3). In one example, Control Center 106 obtains, from converged charging system 104, a CDR that includes an indication of a network slice (e.g., one of network slices 102(1)-102(3)) associated with a chargeable telecommunications event. Based on the indication of the network slice, Control Center 106 identifies a charging rate for the chargeable telecommunications event and applies the charging rate to the chargeable telecommunications event.

Control Center 106 may identify (1) which network slices are being used to offer the service(s) so as to monetize the network slices based on the service offerings; (2) the parties that are actually offering the service (e.g., enterprise, partner, etc.) so as to enable split invoicing amongst those parties; and (3) the parties that are offering the network slice itself (e.g., one or more network operators). This may enable monetization of network slices based on service offerings.

The network operator may invoice enterprises and/or partners based on the network slice(s) (here, network slices 102(1)-102(3)) that is/are actually being consumed by the UE(s). Instead of using the traditional subscription or usage-based billing model, the network operator may calculate/differentiate charging based on the service being offered and the type of network slice being consumed by the enterprise/partners. Thus, differentiated multi-party billing for data usage may be enabled for network operators, enterprises, and/or partners based on network slice. For example, an advanced 5G billing usage differentiator may enable split invoicing for one or more network operators, enterprises, and/or partners.

Billing and rating engine 142 defines different usage allotments and overage charges for different geographic areas or content types based on zones. A zone is a versatile rating mechanism that enables control of rating and usage based on a device geographic location, the type of data content (e.g., the application running on the device), the time of day, etc. These settings may be mixed and matched to create a zone that includes one or more of these attributes, allowing for rating of a configurable range of devices.

In one example, Control Center 106 may identify a zone associated with the network slice (e.g., one of network slices 102(1)-102(3)), and identify the charging rate based on the zone. Consider an example involving a device with a Subscription Permanent Identifier (SUFI) of 10001 that is associated with an account (ACC1) served by a CSP (OP1). Tables 1-3 below demonstrate how this device is assigned to different network slices that provide different services from enterprises/partners, and how the specific zones are assigned to bill for those services.

Table 1 illustrates information stored in billing data store 140 that pertains to operators, enterprises, and partners, including an operator Identifier (ID), account ID, partner account ID, rate plan, rate plan type, and included usage.

TABLE 1

| Operator ID | Account ID | Partner Account ID | Rate Plan | Rate Plan Type | Included Usage |
|---|---|---|---|---|---|
| OP1 | ACC1 | Partner1_eMBB | RP - 01 | MonthlyPool | 10 MB |
| OP1 | ACC1 | Partner2_URRLC | RP - 02 | MonthlyPool | 50 MB |

TABLE 1-continued

| Operator ID | Account ID | Partner Account ID | Rate Plan | Rate Plan Type | Included Usage |
|---|---|---|---|---|---|
| OP1 | ACC2 | Partner3_NBIOT | RP - 03 | MonthlyPool | 100 MB |
| OP2 | ACC3 | Partner4 | RP - 04 | MonthlyPool | 500 MB |

Table 2 illustrates information stored in billing data store 140 that pertains to zone definitions for different network slices corresponding to different 5G applications (e.g., eMBB, URRLC, NBIOT, etc.). The information includes a zone ID, operator ID, zone name, description, default zone, status, Access Point Name (APN)/Data Network Name (DNN) filter, carrier filter, data streams filter, network slice filter, overage unit size, subscription charge, and per unit charge. Filters (e.g., APN/DNN filters, carrier filters, data stream filters, network slice filters, etc.) indicate whether given information is available and can be used to determine the appropriate zone for a given charging record.

TABLE 2

| ZONE ID | OPERATOR ID | ZONE NAME | DESCRIPTION | DEFAULT ZONE | STATUS |
|---|---|---|---|---|---|
| 46414 | OP1 | Ent - eMBB | eMBB based applications | N | A |
| 46514 | OP1 | Ent - URRLC | URRLC based applications | N | A |
| 18113 | OP1 | Ent - NBIOT | NBIOT based applications | N | D |
| 66714 | OP1 | Ent - Default | Default zone | Y | A |

| ZONE ID | APN/DNN FILTER | CARRIER FILTER | DATA STREAMS FILTER | NW SLICE FILTER | Overage Unit Size | Subscription Charge | Per Unit Charge |
|---|---|---|---|---|---|---|---|
| 46414 | N | I | N | Y | 1 MB | $ 5 | $0.1 |
| 46514 | N | I | N | Y | 1 MB | $10 | $0.2 |
| 18113 | N | N | N | Y | 1 MB | $20 | $0.3 |
| 66714 | N | I | N | N | 1 MB | $30 | $0.4 |

Table 3 illustrates information for the device with SUPI 10001. Control Center 106 may be collected/mapped from incoming CDRs that identify different network slices as well as from Tables 1 and 2, which identify zone and other information. This information includes the SUPI, account ID, operator ID, partner account ID, network slice ID, zone ID, record open time, record close time, usage, DR ID, an off-peak indication, duration, and APN/DNN. With this billing information, Control Center 106 may generate electronic invoice data (e.g., differentiated invoices) at the end of the billing period for network operators, enterprises, and partner accounts based on zone assignments to network slices.

TABLE 3

| SUPI | ACCT ID | OP ID | Part Acct Id | NW SLICE ID | ZONE ID | RECORD OPEN TIME | RECORD CLOSE TIME | USAGE | DR ID | IS OFF PEAK | DURATION | APN/DNN |
|---|---|---|---|---|---|---|---|---|---|---|---|---|
| 10001 | ACC1 | OP1 | PA1 | NW eMBB | 46414 | 1:00 AM | 1:05 AM | 1000 | RG1 | N | 200 | AP1 |
| 10001 | ACC1 | OP1 | PA1 | NW eMBB | 46414 | 2:00 AM | 2:01 AM | 3000 | RG1 | N | 100 | AP1 |
| 10001 | ACC1 | OP1 | PA2 | NW URRLC | 46514 | 5:00 PM | 5:10 PM | 230000 | RG2 | N | 1800 | AP3 |
| 10001 | ACC1 | OP1 | PA1 | NW NBIOT | 18113 | 6:00 PM | 6:05 PM | 500 | RG3 | N | 400 | AP4 |
| 10001 | ACC1 | OP1 | PA1 | NW DEF | 66714 | 8:00 PM | 8:30PM | 2000 | RG4 | N | 600 | AP5 |

Figure 2:
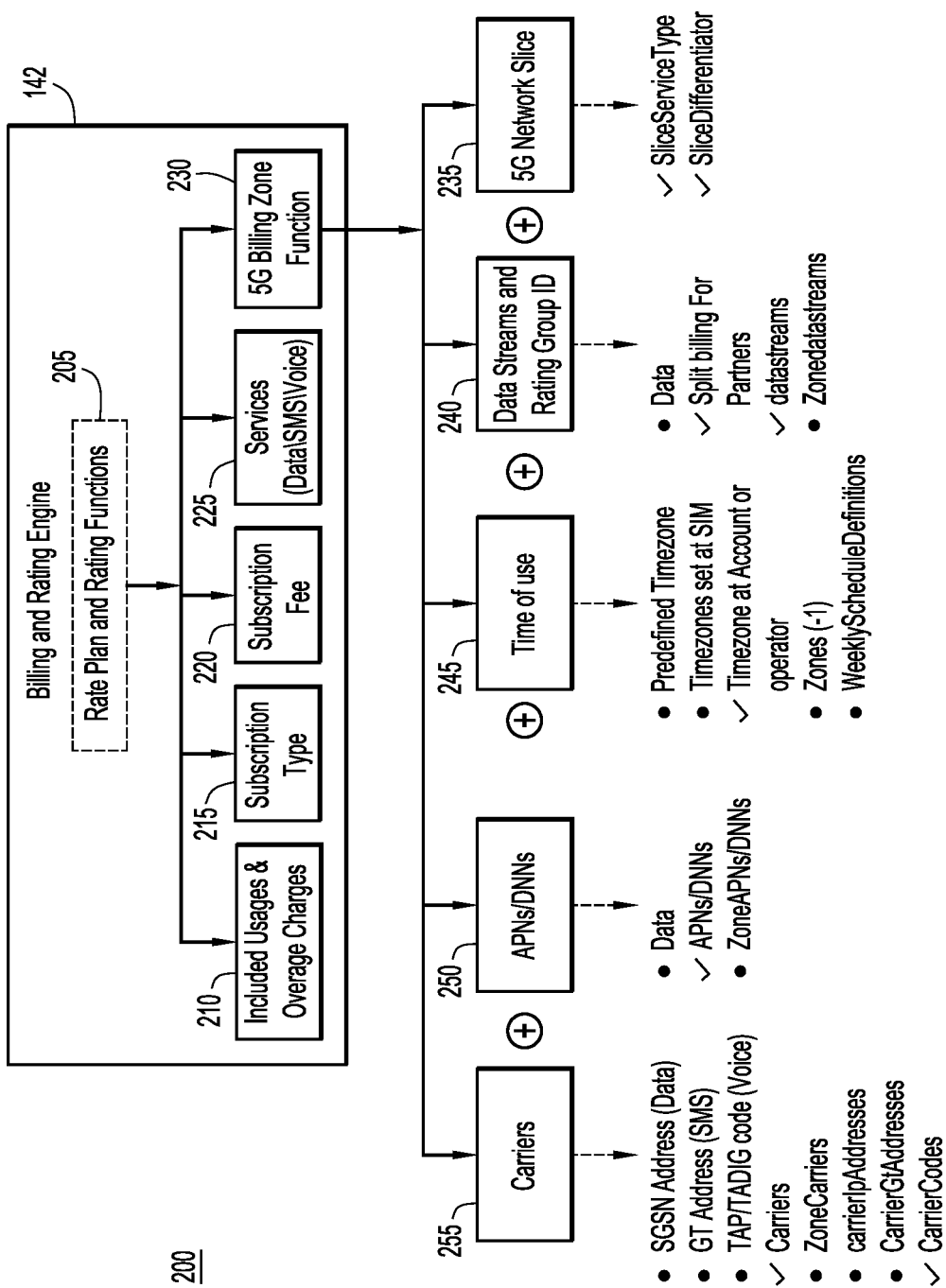
FIG. 2 illustrates a block diagram of a billing and rating engine configured for network slice based billing, according to an example embodiment.

With continued reference to FIG. 1, FIG. 2 illustrates a block diagram 200 of billing and rating engine 142. As shown, billing and rating engine 142 includes rate plan and rating functions 205, including included usages and overage charges 210, subscription type 215, subscription fee 220, services 225 (e.g., data, Short Message Service (SMS), voice, etc.), and 5G billing zone function 230. 5G billing zone function 230 extends the definition of zones to include various pricing policy attributes such as information pertaining to 5G network slice 235, which may include slice service type and slice differentiator. In one example, the CDR(s) obtained by Control Center 106 include an indication of the slice service type and/or slice differentiator of a network slice. This enables Control Center 106 to differentiate the services being offered, the network slice being consumed, the network operators, the enterprises, and the partners.

5G billing zone function 230 may also include other pricing policy attributes such as information pertaining to data streams and rating group ID 240, time of use 245, APN/DNNs 250, and carriers 255. Information pertaining to data streams and rating group ID 240 includes data, split billing for partners (e.g., identification of different partner accounts), data streams, and zone data streams. Information pertaining to time of use 245 includes a predefined time zone, a time zone set at a Subscriber Identification Module (SIM), a time zone of an account or operator, a default zone to be selected if there is no match for prioritized zones (denoted as "Zones −1"), and weekly schedule definitions. Information pertaining to APNs/DNNs 250 includes data, APNs/DNNs, and zone APNs/DNNs. Information pertaining to carriers 255 includes Serving General Packet Radio Service (GPRS) Support Node (SGSN) address (e.g., for data), Global Title (GT) address (e.g., for SMS), Transferred Account Procedure (TAP)/Transferred Account Data Interchange Group (TADIG) code (e.g., for voice), carriers, zone carriers, carrier Internet Protocol (IP) addresses, carrier GT addresses, and carrier codes.

In one example, the CDR(s) obtained by Control Center 106 further include an indication of the information pertaining to data streams and rating group ID 240, time of use 245, APNs/DNNs 250, and/or carriers 255. 5G billing zone function 230 may use the information pertaining to 5G network slice 235, data streams and rating group ID 240, time of use 245, APNs/DNNs 250, and/or carriers 255, as input(s) to generate billing/invoicing/charging calculations for different parties. In one example, any suitable pricing policy attribute may be used to determine any of included usages and overage charges 210, subscription type 215, subscription fee 220, services 225, and/or 5G billing zone function 230.

Figure 3:
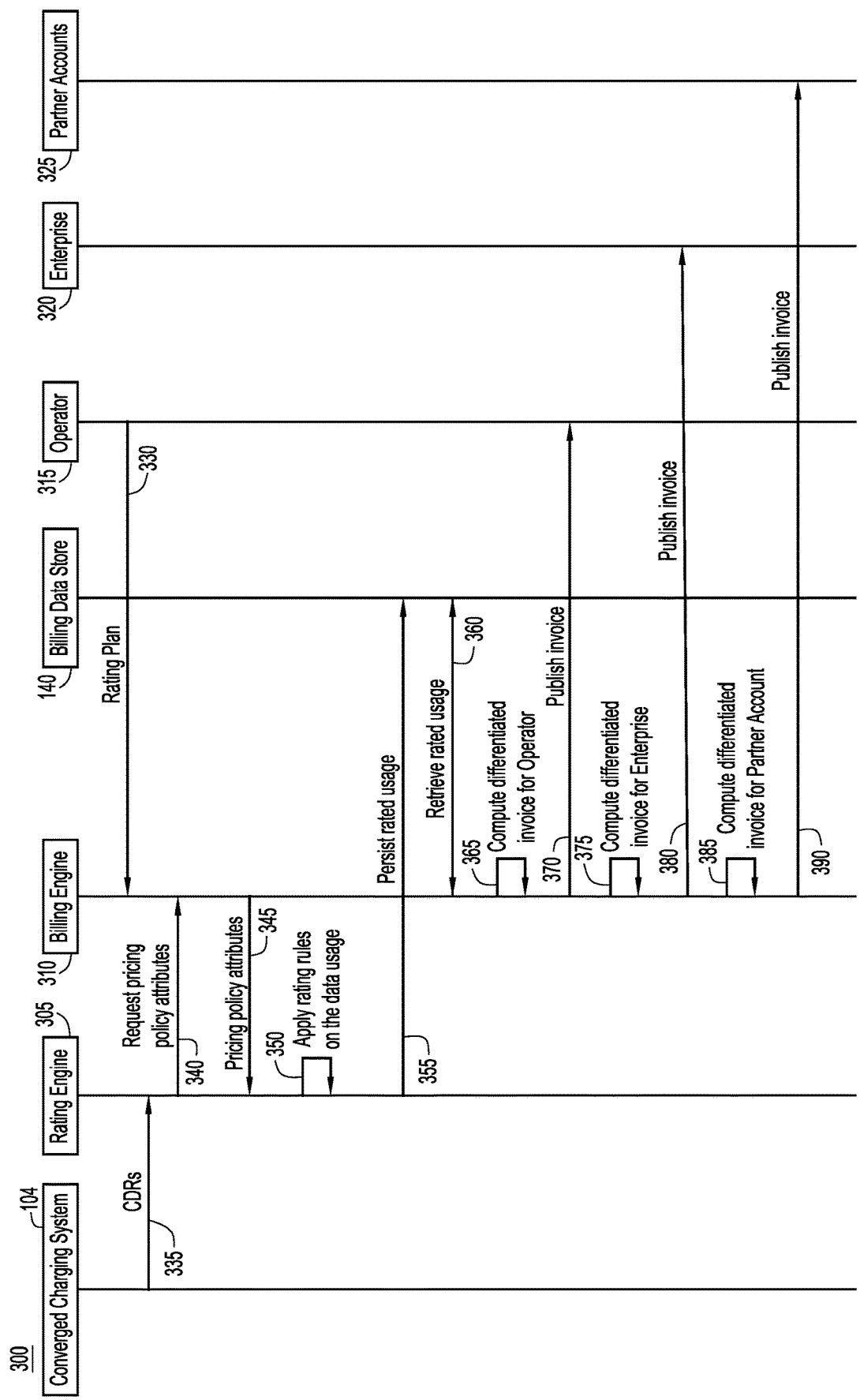
FIG. 3 illustrates a sequence diagram of a method for network slice based billing, according to an example embodiment.

With continued reference to FIGS. 1 and 2, FIG. 3 illustrates a sequence diagram of a method 300 for network slice based billing. Method 300 involves operations performed by converged charging system 104, rating engine 305, billing engine 310, billing data store 140, operator 315, enterprise 320, and partner accounts 325. Rating engine 305 and billing engine 310 may belong to billing and rating engine 142. Operator 315 may be a network operator responsible for managing a network slice associated with the chargeable telecommunications event. Enterprise 320 may be associated with the network slice, and partner account 325 may be a partner that provides a service over the network slice on behalf of enterprise 320.

At operation 330, billing engine 310 obtains, from operator 315, a rating plan that maps a charging rate for a chargeable telecommunications event to the network slice. In one example, operator 315 may configure the pricing policy for one or more 5G network slices. For instance, one network slice may be available for low-cost and high-latency IoT traffic, and another network slice may be for high-cost and low-latency emergency response services. At operation 335, rating engine 305 obtains, from converged charging system 104, one or more data usage streams generated by the relevant UE (e.g., CDRs).

At operation 340, rating engine 305 requests, from billing engine 310, various pricing policy attributes associated with the UE. The pricing policy attributes may include 5G network slice 235 (e.g., network slice service type, network slice differentiator/type, etc.), data streams and rating group ID 240, time of use 245, APNs/DNNs 250, and/or carriers 255. At operation 345, billing engine 310 returns the pricing policy attributes to rating engine 305. At operation 350, rating engine 305 applies one or more rating rules to the data usage based on the charging rate/rating plan obtained from operator 315 and the pricing policy attributes including 5G network slice 235. In one example, rating engine 305 determines the appropriate charge based on the relevant network slice.

At operation 355, rating engine 305 persists the rated usage to billing data store 140. At operation 360, billing engine 310 retrieves the rated usage from billing data store 140. At operation 365, billing engine 310 generates first electronic invoice data for the chargeable telecommunications event based on the rated usage. At operation 370, billing engine 310 provides the first electronic invoice data to operator 315. At operation 375, billing engine 310 generates second electronic invoice data for the chargeable telecommunications event based on the rated usage. At operation 380, billing engine 310 provides the second electronic invoice data to enterprise 320. At operation 385, billing engine 310 generates third electronic invoice data for the chargeable telecommunications event based on the rated usage. At operation 390, billing engine 310 provides the third electronic invoice data to partner accounts 325.

Figure 4:
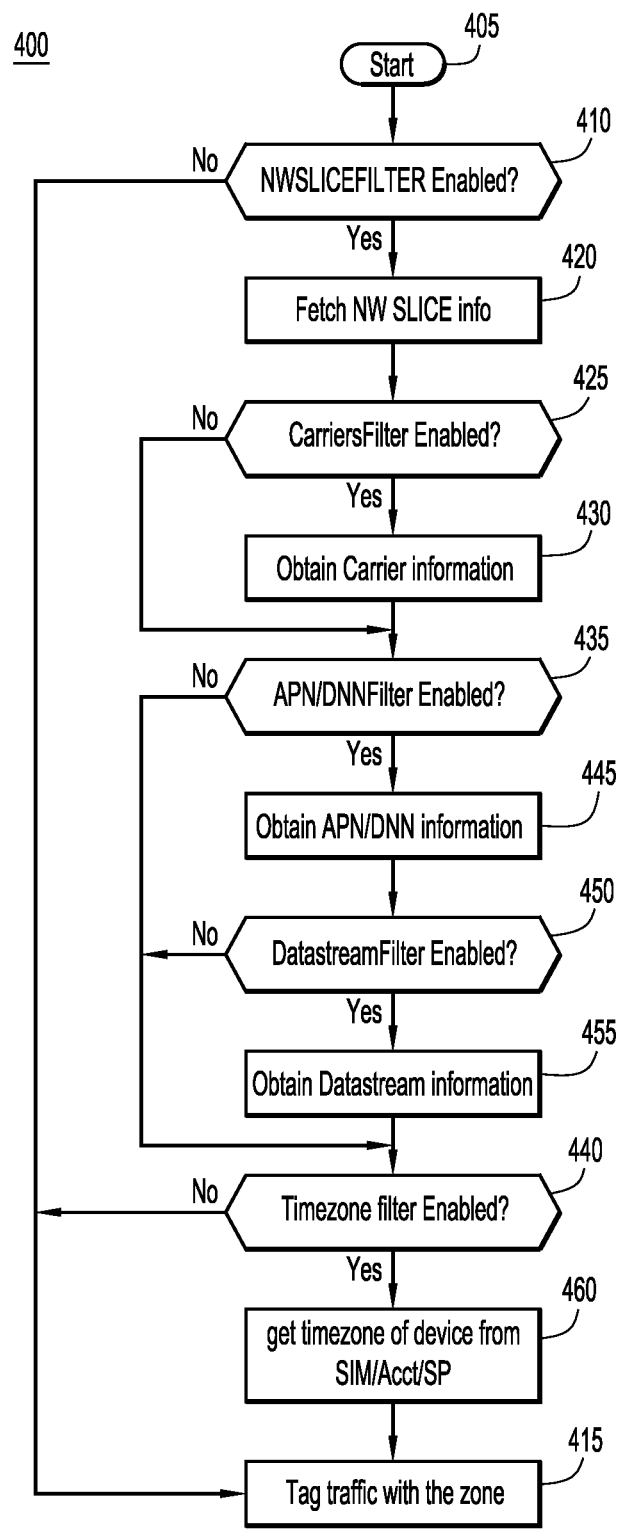
FIG. 4 illustrates a flowchart of a method for network slice based billing, according to an example embodiment.

With continued reference to FIG. 3, FIG. 4 illustrates a flowchart of an example method 400 for network slice based billing. Method 400 may be a rank/priority-based process to determine the appropriate zone/pricing policy for a given charging record, and may define different levels of priority for defining zones using filters. In one example, method 400 may be performed by rating engine 305 at operation 350. Method 400 may involve mapping information from CDRs (obtained at operation 335), with information from pricing policy attributes (obtained at operation 345), to determine information used to generate electronic invoice data based on network slice.

At operation 405, method 400 begins. Method 400 may involve looping through a list of zone by priority/ranking, and may be performed for each zone. At operation 410, rating engine 305 determines whether a network slice filter is enabled (e.g., whether information regarding the network slice associated with a zone is available). The network slice filter thus adds a level of customization for pricing policies. For example, an operator may choose whether to filter usages based on network slices using the network slice filter. If the network slice filter is not enabled, at operation 415 rating engine 305 tags the traffic (e.g., CDR information) with the appropriate zone. If the network slice filter is enabled, at operation 420, rating engine 305 fetches information regarding the network slice. In this example, the network slice filter is the highest priority filter because it is the first filter analyzed in method 400, but it will be appreciated that any suitable filter type may be at any suitable level of priority.

At operation 425, rating engine 305 determines whether a carrier filter is enabled (e.g., whether information regarding the carrier associated with a zone is available). If the carrier filter is enabled, rating engine 305 obtains the carrier information at operation 430 and determines whether an APN/DNN filter is enabled (e.g., whether information regarding the APN/DNN associated with a zone is available) at operation 435. If the network slice filter is not enabled, at operation 435, rating engine 305 determines whether the APN/DNN filter is enabled.

If the APN/DNN filter is not enabled, rating engine 305 determines whether a time zone filter is enabled at operation 440. If the APN/DNN filter is enabled, rating engine 305 obtains the APN/DNN information at operation 445 and determines whether a data stream filter is enabled (e.g., whether information regarding the data stream associated with a zone is available) at operation 450. If the data stream filter is not enabled, rating engine 305 determines whether the time zone filter is enabled at operation 440. If the data stream filter is enabled, rating engine 305 obtains the data stream information at operation 455 and determines whether the time zone filter is enabled at operation 440. If the time zone filter is not enabled, rating engine 305 tags the traffic with the appropriate zone at operation 415. If the time zone filter is enabled, rating engine 305 obtains the time zone of the device from the SIM/account/service provider at operation 460 and tags the traffic with the appropriate zone at operation 415.

Figure 5:
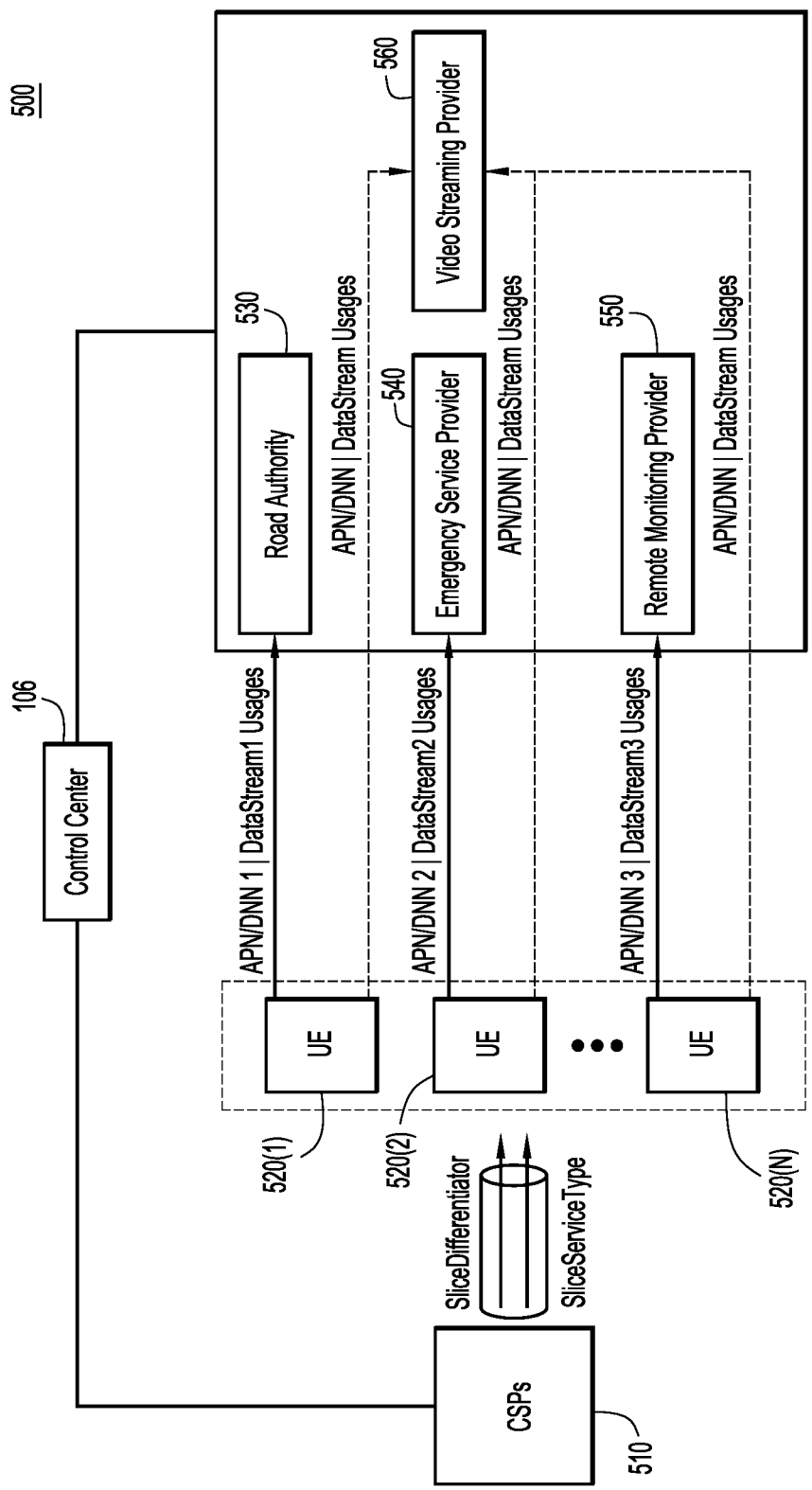
FIG. 5 illustrates a block diagram of a connected car system configured for network slice based billing, according to an example embodiment.

With continued reference to FIG. 1, FIG. 5 illustrates a block diagram of an example connected car system 500 configured for network slice based billing. Connected car system 500 includes CSPs 510, UEs (e.g., connected cars) 520(1)-520(N), road authority 530, emergency service provider 540, remote monitoring provider 550, video streaming provider 560, and Control Center 106. Road authority 530, emergency service provider 540, remote monitoring provider 550, and video streaming provider 560 may be enterprises or partners.

As shown, CSPs 510 offer network slices, identified by network slice differentiator and network slice service type, for use by UEs 520(1)-520(N). UE 520(1) uses a first network slice associated with APN/DNN 1 and data stream 1 usages to send/receive network traffic to road authority 530. UE 520(2) uses a second network slice associated with APN/DNN 2 and data stream 2 usages to send/receive network traffic to emergency service provider 540. UE 520(N) uses a third network slice associated with APN/DNN 3 and data stream 3 usages to send/receive network traffic to remote monitoring provider 550. UEs 520(1)-520(N) use a fourth network slice associated with multiple APNs/DNNs and data stream usages to send/receive network traffic to video streaming provider 560.

Control Center 106 may apply one or more charging rates to chargeable telecommunication events based on the first, second, third, and fourth network slices. Control Center 106 may further generate electronic invoice data for the chargeable telecommunications events and provide the electronic invoice data to CSPs 510, road authority 530, emergency service provider 540, remote monitoring provider 550, and/or video streaming provider 560. Thus, an advanced 5G billing usage differentiator may be used to rate and differentiate usages generate by UEs 520(1)-520(N) based on attributes including usages from specific CSPs of CSPs 510, network slice service type, network slice type, APNs/DNNs, rating group ID, data streams, etc.

Figure 6:
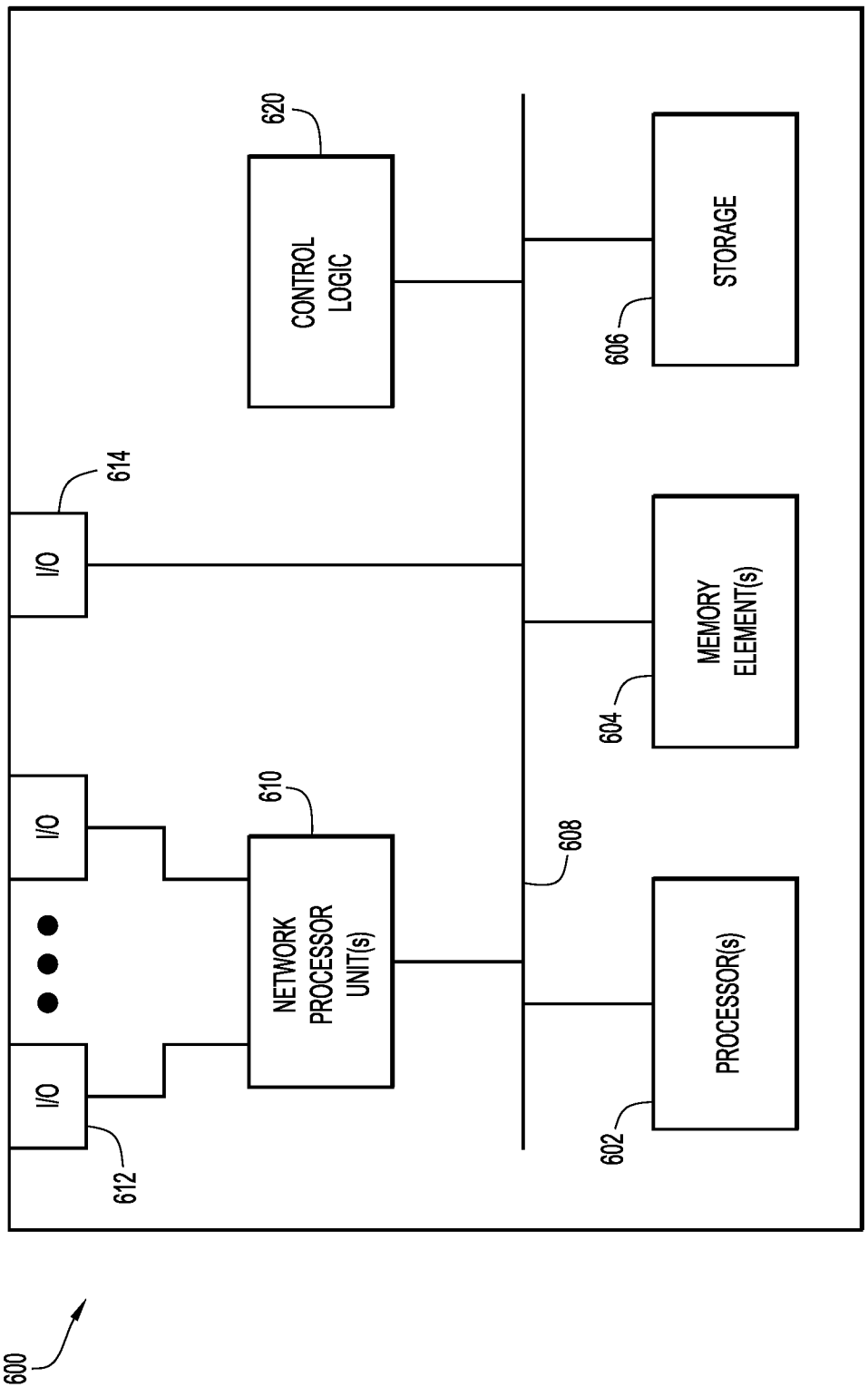
FIG. 6 illustrates a hardware block diagram of a computing device configured to perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, computing device may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 7:
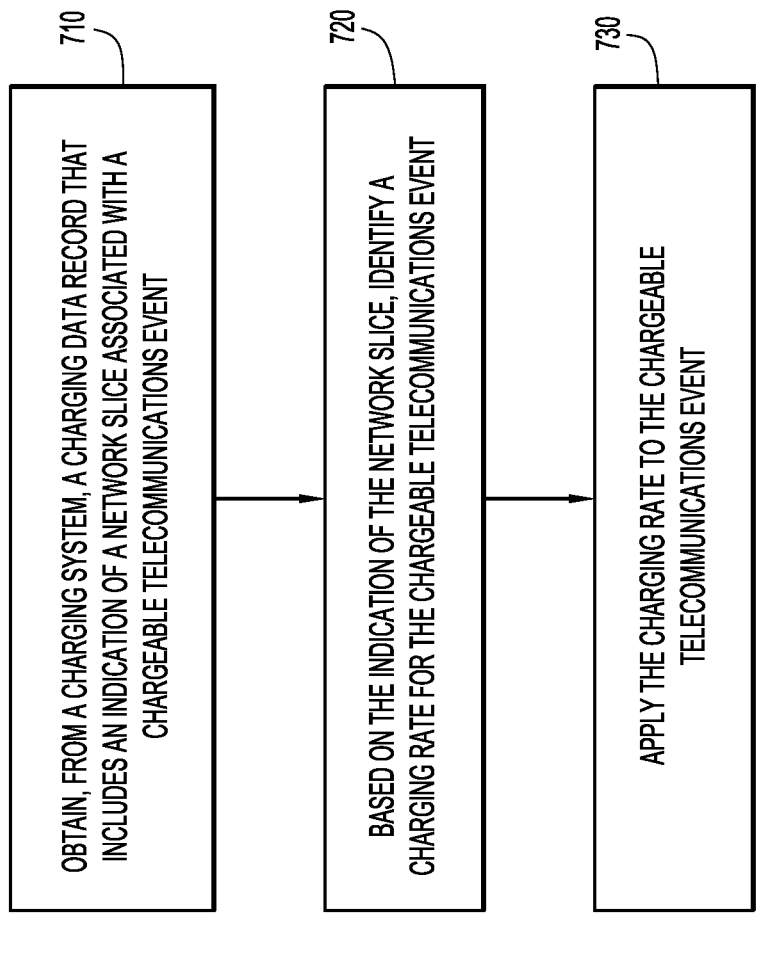
FIG. 7 illustrates a flowchart of a method for performing functions associated with operations discussed herein, according to an example embodiment.

FIG. 7 is a flowchart of an example method 700 for performing functions associated with operations discussed herein. Method 700 may be performed by any suitable entity, such as Control Center 106. At operation 710, Control Center 106 obtains, from a charging system, a charging data record that includes an indication of a network slice associated with a chargeable telecommunications event. At operation 720, based on the indication of the network slice, Control Center 106 identifies a charging rate for the chargeable telecommunications event. At operation 730, Control Center 106 applies the charging rate to the chargeable telecommunications event.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: obtaining, from a charging system, a charging data record that includes an indication of a network slice associated with a chargeable telecommunications event; based on the indication of the network slice, identifying a charging rate for the chargeable telecommunications event; and applying the charging rate to the chargeable telecommunications event.

In one example, the method further comprises: identifying a zone associated with the network slice, wherein identifying the charging rate includes identifying the charging rate based on the zone.

In one example, obtaining the charging data record includes: obtaining a charging data record that includes an indication of a slice service type of the network slice.

In one example, the method further comprises: obtaining the charging data record includes: obtaining a charging data record that includes an indication of a slice differentiator of the network slice.

In one example, the method further comprises: obtaining, from a network operator, a rating plan that maps the charging rate to the network slice, wherein identifying the charging rate includes identifying the charging rate based on the rating plan.

In one example, the method further comprises: generating electronic invoice data for the chargeable telecommunications event.

In a further example, the method further comprises: providing, to a network operator responsible for managing the network slice, first electronic invoice data of the electronic invoice data; providing, to an enterprise associated with the network slice, second electronic invoice data of the electronic invoice data; and providing, to a partner that provides a service over the network slice on behalf of the enterprise, a third electronic invoice data of the electronic invoice data.

In another form, an apparatus is provided. The apparatus comprises: a network interface configured to obtain or provide network communications; and one or more processors coupled to the network interface, wherein the one or more processors are configured to: obtain, from a charging system, a charging data record that includes an indication of a network slice associated with a chargeable telecommunications event; based on the indication of the network slice, identify a charging rate for the chargeable telecommunications event; and apply the charging rate to the chargeable telecommunications event.

In another form, one or more non-transitory computer readable storage media are provided. The non-transitory computer readable storage media are encoded with instructions that, when executed by a processor, cause the processor to: obtain, from a charging system, a charging data record that includes an indication of a network slice associated with a chargeable telecommunications event; based on the indication of the network slice, identify a charging rate for the chargeable telecommunications event; and apply the charging rate to the chargeable telecommunications event.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   storing, in a billing data store, data indicative of a provider of a network slice associated with a chargeable telecommunications event and data indicative of a provider of a service associated with the chargeable telecommunications event;
   obtaining, from a charging system, a charging data record that includes an indication of the network slice associated with the chargeable telecommunications event;
   based on the charging data record, retrieving from the billing data store the data indicative of the provider of the network slice associated with the chargeable telecommunications event and the data indicative of the provider of the service associated with the chargeable telecommunications event;
   based on one or more of the indication of the network slice, the provider of the network slice, or the provider of the service, identifying a charging rate for the chargeable telecommunications event; and
   applying the charging rate to the chargeable telecommunications event.

2. The method of claim 1, further comprising:
   identifying a zone associated with the network slice, wherein identifying the charging rate includes identifying the charging rate based on the zone.

3. The method of claim 1, wherein obtaining the charging data record includes:
   obtaining a charging data record that includes an indication of a slice service type of the network slice.

4. The method of claim 1, wherein obtaining the charging data record includes:
   obtaining a charging data record that includes an indication of a slice differentiator of the network slice.

5. The method of claim 1, further comprising:
   obtaining, from a network operator, a rating plan that maps the charging rate to the network slice, wherein identifying the charging rate includes identifying the charging rate based on the rating plan.

6. The method of claim 1, further comprising:
   generating electronic invoice data for the chargeable telecommunications event.

7. The method of claim 6, further comprising:
   providing, to a network operator responsible for managing the network slice, first electronic invoice data of the electronic invoice data;
   providing, to the provider of the network slice, second electronic invoice data of the electronic invoice data; and
   providing, to the provider of the service, a third electronic invoice data of the electronic invoice data.

8. An apparatus comprising:
   a network interface configured to obtain or provide network communications;
   one or more memories, and
   one or more processors coupled to the network interface, wherein the one or more processors are configured to:
      store, in a billing data store of the one or more memories, data indicative of a provider of a network slice associated with a chargeable telecommunications event and data indicative of a provider of a service associated with the chargeable telecommunications event;
      obtain, from a charging system, a charging data record that includes an indication of the network slice associated with the chargeable telecommunications event;
      based on the charging data record, retrieve from the billing data store the data indicative of the provider of the network slice associated with the chargeable telecommunications event and the data indicative of the provider of the service associated with the chargeable telecommunications event;
      based on one or more of the indication of the network slice, the data indicative of the provider of the network slice or the data indicated of the provider of the service, identify a charging rate for the chargeable telecommunications event; and
      apply the charging rate to the chargeable telecommunications event.

9. The apparatus of claim 8, wherein the one or more processors are further configured to:
   identify a zone associated with the network slice; and
   identify the charging rate based on the zone.

10. The apparatus of claim 8, wherein the one or more processors are configured to:
    obtain a charging data record that includes an indication of a slice service type of the network slice.

11. The apparatus of claim 8, wherein the one or more processors are configured to:
    obtain a charging data record that includes an indication of a slice differentiator of the network slice.

12. The apparatus of claim 8, wherein the one or more processors are further configured to:
   obtain, from a network operator, a rating plan that maps the charging rate to the network slice; and
   identify the charging rate based on the rating plan.

13. The apparatus of claim 8, wherein the one or more processors are further configured to:
   generate electronic invoice data for the chargeable telecommunications event.

14. The apparatus of claim 13, wherein the one or more processors are further configured to:
   provide, to a network operator responsible for managing the network slice, first electronic invoice data of the electronic invoice data;
   provide, to the provider of the network slice, second electronic invoice data of the electronic invoice data; and
   provide, to the provider of the service, a third electronic invoice data of the electronic invoice data.

15. One or more non-transitory computer readable storage media encoded with instructions that, when executed by a processor, cause the processor to:
   store, in a billing data store, data indicative of a provider of a network slice associated with a chargeable telecommunications event and data indicative of a provider of a service associated with the chargeable telecommunications event;
   obtain, from a charging system, a charging data record that includes an indication of the network slice associated with the chargeable telecommunications event;
   based on the charging data record, retrieved from the billing data store the data indicative of the provider of the network slice associated with the chargeable telecommunications event and the data indicative of the provider of the service associated with the chargeable telecommunications event;
   based on one or more of the indication of the network slice, the data indicative of the provider of the network slice or the data indicative of the provider of the service, identify a charging rate for the chargeable telecommunications event; and
   apply the charging rate to the chargeable telecommunications event.

16. The one or more non-transitory computer readable storage media of claim 15, wherein the instructions further cause the processor to:
   identify a zone associated with the network slice; and
   identify the charging rate based on the zone.

17. The one or more non-transitory computer readable storage media of claim 15, wherein the instructions further cause the processor to:
   obtain a charging data record that includes an indication of a slice service type of the network slice.

18. The one or more non-transitory computer readable storage media of claim 15, wherein the instructions further cause the processor to:
   obtain a charging data record that includes an indication of a slice differentiator of the network slice.

19. The one or more non-transitory computer readable storage media of claim 15, wherein the instructions further cause the processor to:
   obtain, from a network operator, a rating plan that maps the charging rate to the network slice; and
   identify the charging rate based on the rating plan.

20. The one or more non-transitory computer readable storage media of claim 15, wherein the instructions further cause the processor to:
   generate electronic invoice data for the chargeable telecommunications event;
   provide, to a network operator responsible for managing the network slice, first electronic invoice data of the electronic invoice data;
   provide, to the provider of the network slice, second electronic invoice data of the electronic invoice data; and
   provide, to the provider of the service, a third electronic invoice data of the electronic invoice data.

* * * * *